Dec. 31, 1968     D. O. RALEIGH     3,419,760
IONIC SOLID STATE ELECTROCHEMICAL CAPACITOR
Filed June 9, 1967

INVENTOR.
DOUGLAS O. RALEIGH
BY
ATTORNEY

United States Patent Office 3,419,760
Patented Dec. 31, 1968

3,419,760
IONIC SOLID STATE ELECTROCHEMICAL CAPACITOR
Douglas O. Raleigh, Canoga Park, Calif., assignor to North American Rockwell Corporation, a corporation of Delaware
Continuation-in-part of application Ser. No. 490,585, Sept. 27, 1965. This application June 9, 1967, Ser. No. 655,975
8 Claims. (Cl. 317—230)

ABSTRACT OF THE DISCLOSURE

This disclosure describes a solid state electrochemical capacitor employing a cell combination: reversible solid electrode, solid ionic conductor, inert metallic conductor. Such combinations provide a double layer capacitance of several hundred microfarads per square centimeter and a capability for miniaturization and elevated temperature operation.

---

This application is a continuation-in-part of my application Ser. No. 490,585, now abandoned, filed Sept. 27, 1965.

The present invention is directed to solid state electrochemical devices and more particularly to devices utilizing the double layer capacitance between a solid ionic conductor and an inert metallic electrode.

Electrochemical capacitors previously proposed have been of the ordinary liquid electrolytic type. Such devices have the following disadvantages: (1) ionic leakage currents are present which tend to age or deteriorate the capacitor, (2) they require the formation of a non-conducting anodic film to function as capacitors, (3) they require complicated cell construction since provision must be made for holding and sealing the liquid electrolyte, (4) they have small capacitance per unit area compared to solid electrochemical devices, (5) they are not readily adaptable to miniaturization, and (6) they are not capable of operation at elevated temperatures.

It is therefore the primary object of the present invention to provide a solid electrochemical device utilizing the high double layer capacitance between a solid ionic conductor and an inert metallic conductor.

Another object of the present invention is to provide a solid electrochemical capacitor which has a capacitance essentially independent of temperature at elevated temperatures under selected conditions.

Another object of the present invention is to provide a solid electrochemical capacitor utilizing a solid ionic conductor in which the capacitance is independent of the thickness of the ionic conductor.

A further object of the present invention is to provide a solid electrochemical capacitor which is particularly useful at elevated temperatures and which is extremely simple in design and capable of miniaturization.

A still further object of the present invention is to provide a solid electrochemical device which essentially eliminates ionic leakage currents and resulting deterioration, and does not require a non-conducting anodic film.

These and other objects of the present invention will become more apparent from the following detailed description of various embodiments of the present invention taken together with the drawings, hereby made a part thereof, in which.

Figure 1:
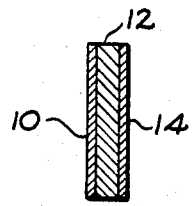
FIG. 1 is a cross-sectional view of the preferred embodiment.

Referring now to FIG. 1 in detail, a cross-sectional view of the electrochemical device of the present invention is shown. The preferred device comprises a reversible solid electrode 10, a solid ionic conductor 12, and an inert metallic conductor 14. The solid ionic conductor 12 is preferably in pellet form with the electrode 10 and inert conductor 14 in electrical contact with opposite ends or surfaces. Such contact may be achieved through well-known spring loaded frames, by compaction, by flash melting the solid ionic conductor, or by vapor depositing electrodes 10 and 14 on the ionic conductor. Such methods are well-known and therefore are not described in detail herein. Alternatively, the entire cell may be formed as a thin film device by successive vapor deposition of one electrode, the solid ionic conductor and the remaining electrode. Such deposition techniques are well-known in the art. Encapsulation with an inert material may be used where desirable to provide protection from environmental effects, particularly for high temperature uses.

The preferred embodiment of the present invention comprises a reversible solid electrode 10 of Ag, a solid ionic conductor 12 of AgBr and an inert metallic conductor of Pt. A reversible electrode is defined as one showing chemical reversibility in an electric cell. (See The Encyclopedia of Electrochemistry, edited by Clifford A. Hampel (Reinhold Publishing Corporation, 1964), at pp. 1010–1011, for a discussion of reversibility.) The solid ionic conductor was a pellet ¼ inch in diameter having a thickness of about 1 mm. with the electrode 10 and conductor 14 in the form of foils contacting opposite ends of the pellet. Lead connections to the foils were made by standard techniques. When an appropriate range of polarizing bias is applied to such a device, ionic discharge will be completely blocked at the ionic conductor-inert electrode interface. As a result, this interface will function as a capacitative circuit element in which the high double layer capacitance of such interfaces may be utilized. An electrode double layer may be represented as two parallel sheets of charge of opposite sign. (See the above referenced Encyclopedia of Electrochemistry, at pp. 404–409, for a more detailed discussion of double layer capacitance.) Specifically, the capacitance of the AgBr/Pt interface, i.e., at the contacting surface between the solid ionic conductor 12 and inert metallic conductor 14, is about 200 $\mu$f./cm.$^2$ and is essentially independent of temperature over the range of from 250° to 350° C. and over a bias span of from 0.1 to 0.3 v. At bias voltages on either side of that range the capacitance increases and becomes temperature dependent.

Figure 2:
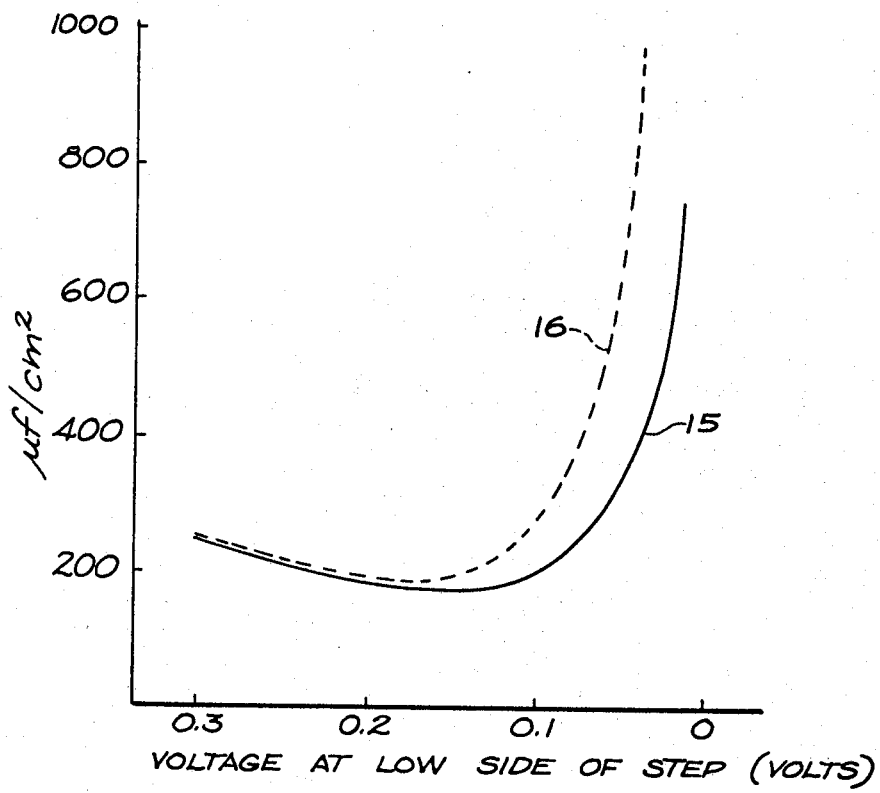
FIG. 2 is a graph of the relationship between capacitance and bias voltage range for different temperatures.

FIG. 2 shows the capacitance for the preferred embodiment when a 0.1 v. voltage step is applied to the initially polarized AgBr/Pt interface. Curve 15 shows this relationship at a temperature of about 250° C., while curve 16 is for a temperature of about 300° C. The charging current obtained when a voltage step of 0.1 v. is applied does not decay with a single time constant and therefore the capacitance is frequency dependent in certain frequency ranges. The double layer capacitance of the preferred embodiment at the interface of the solid ionic conductor in contact with the inert metallic electrode, on a per unit area basis, is at least an order of magnitude greater than those of prior art capacitance devices. Further, as is apparent from FIG. 2, the present invention is uniquely suited for use at elevated temperatures.

The area of the double layer capacitive zone between the solid ionic conductor 12 and the inert conductor 14 determines the capacitance of the device. The capacitance-area relationship is linear so that the desired capacitance may be selected during fabrication by choice of the area of the ionic conductor-inert conductor interface. The capacitance is independent of the thickness of the ionic conductor 12. However, the resistance of the ionic conductor is linearly related to the thickness and is dependent upon temperature and the interface area. For the specific embodiment described above, resistance values of about 100 ohms were obtained at about 250° C., 20 ohms at about 300° C. and about 5 ohms at about 350° C. Thus, the device of the present invention provides a series RC network in which the capacitance and resistance values may be independently varied.

The present invention contemplates the use of a solid ionic conductor 12 having an ionic conductivity of at least about $10^{-6}$ ohm$^{-1}$ cm.$^{-1}$. In addition, a low electronic conductivity is required since otherwise an electronic leakage current will be present when the device is under bias. Exemplary of the electronic conductivity requirements is the low electronic leakage current of the preferred embodiment which was less than about 0.1 μamp and ranged from about 0.01 to about 0.1 μamp for the temperature range of from about 250° C. to about 350° C. The solid ionic conductor 12 has one contacting interface with a metallic conductor 14 which is inert with respect to the solid ionic conductor, to provide an area of double layer capacitance. A contact is made with the surface of a second electrode 10 that is able to accept or donate ions to the solid ionic conductor by means of a reversible electrode reaction.

A number of systems meet these criteria and have characteristics generally similar to the preferred embodiment. Thus, for the Ag halides, i.e., I, Cl and Br, as the solid ionic conductor, the reversible electrode may be Ag, or in the case of the iodide, an iodine and graphite mixture, and the inert metallic conductor may be Pt or Au. For the Cu halides as the solid ionic conductor, the reversible electrode may be Cu or an iodine-graphite mixture, while the inert metallic conductor may be Ag, Hg, Pt, Au or Pd. For the Pb halides as the solid ionic conductor, the reversible electrode may be Pb or C, I$_2$ while the inert metallic conductor may be any common metal that is less electropositive than Pb, e.g., Cu, Ag, Pt, Au. The inert metallic conductor may also be graphite or a carbon-based electronically conductive mixture. While graphite or carbon-based mixtures have been found to have a lower capacitance per unit area than Pt or Au for the case of an Ag halide as electrolyte, certain other desirable features such as ease of cell compaction may lend attractiveness to their use. Other capacitative systems utilizing solid ionic conductors include Ag (or C, I$_2$)/Ag$_2$HgI$_4$/Pt (or Au); Ag (or C, I$_2$)/Ag$_3$SI/Pt (or Au) or other Ag$_3$SI based ionic conductors; C, I$_2$/KI/any common metal; CU (or C, I$_2$)/Cu$_2$HgI$_4$/Pt (or Au).

Essentially any solid ionic conducting composition may be used for the conductor 12 of the present invention. For example, a novel class of solid ionic conductive compositions of the system of alkali halide-silver halide, e.g., alkali metal silver iodide salts, may be used as the solid ionic conductor. Such compositions are described and claimed in the copending application of Argue et al., Ser. No. 569,193, entitled "Solid Ionic Conductors." Another class of utilizable solid ionic conductive compositions is the system of substituted and unsubstituted organic ammonium halide alkali halide compounds and mixtures, e.g., a quaternary ammonium silver iodide salt, described and claimed in the copending application of Boone B. Owens, Ser. No. 651,499, entitled "Solid Electrolytes." Both of these copending applications are assigned to the assignee of the present invention.

The ionic conducting characteristics of the solid ionic conductors mentioned above may be enhanced by the addition of ionic doping agents, such as CdBr$_2$ for the preferred AgBr solid ionic conductor. Other ionic doping agents well-known in the art may be used for the other systems outlined above.

The solid electrochemical device of the present invention is particularly suitable for use in integrated circuits and microcircuitry. Since the capacitance of the present invention is linearly related to area and the specific capacitance is high, close control is possible over capacitance values incorporated into small areas.

Although particular embodiments of the present invention have been described, various modifications will be apparent to those skilled in the art without departing from the scope of the invention. Therefore, the present invention is not limited to the specific embodiments disclosed but only by the appended claims.

I claim:

1. A solid state capacitative device comprising a solid ionic conductor, reversible solid electrode means contacting one surface of said ionic conductor for accepting ions from the ionic conductor upon a potential difference therewith of one polarity and donating ions to the ionic conductor upon a potential difference therewith of the other polarity, metallic electrode means contacting another surface of said ionic conductor, said metallic electrode means being chemically non-reactive with the ionic conductor and forming a capacitative double layer interface with said ionic conductor.

2. The device of claim 1 wherein said solid ionic conductor has an ionic conductivity of at least about $10^{-6}$ ohm$^{-1}$ cm.$^{-1}$ and a low electronic leakage current.

3. The device of claim 2 wherein said electronic leakage current is less than about 0.1 μamp.

4. The device of claim 1 wherein said solid ionic conductor is a silver halide.

5. The device of claim 4 wherein said solid ionic conductor is AgBr.

6. The device of claim 1 wherein said reversible solid electrode is Ag and said non-reactive metallic electrode is Pt.

7. The device of claim 1 wherein said solid ionic conductor contains a silver iodide salt and said reversible solid electrode includes an iodine and graphite mixture.

8. The device of claim 1 wherein said solid ionic conductor includes an ionic doping agent for enhancing the ionic conductivity.

References Cited

UNITED STATES PATENTS

| | | | |
|---|---|---|---|
| 3,202,891 | 8/1965 | Frankl | 317—235.9 |
| 3,268,783 | 8/1966 | Saburi | 317—230 |
| 3,274,025 | 9/1966 | Ostis. | |

JAMES D. KALLAM, *Primary Examiner.*

U.S. Cl. X.R.

29—569; 317—237, 258